Figure 1:
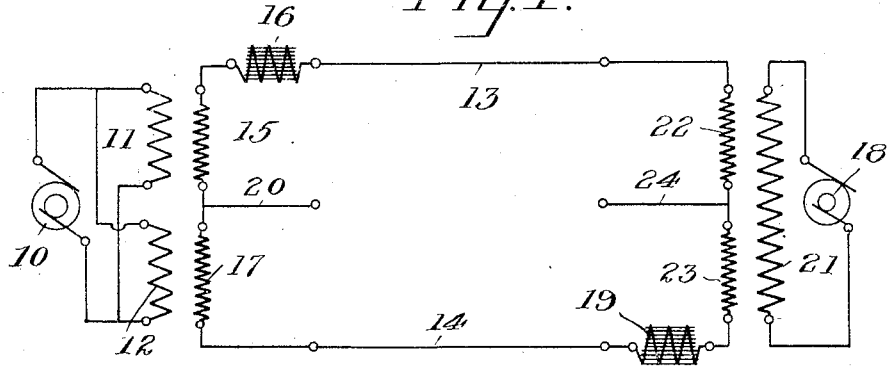

W. F. GRADOLPH & W. C. HAHNE.
METHOD OF TRANSMITTING ELECTRICAL ENERGY.
APPLICATION FILED APR. 7, 1910.

959,428.

Patented May 24, 1910.

Witnesses
Jos. F. Collins
L. C. Brady

Inventors
William F. Gradolph
By William C. Hahne
Higdon & Longan
Attorneys

UNITED STATES PATENT OFFICE.

WILLIAM F. GRADOLPH, OF ST. LOUIS, MISSOURI, AND WILLIAM C. HAHNE, OF CHICAGO, ILLINOIS, ASSIGNORS TO GRADOLPH ELECTRIC COMPANY, OF ST. LOUIS, MISSOURI, A CORPORATION OF ARIZONA TERRITORY.

METHOD OF TRANSMITTING ELECTRICAL ENERGY.

959,428.  Specification of Letters Patent.  Patented May 24, 1910.

Original application filed December 20, 1905, Serial No. 292,529. Divided and this application filed April 7, 1910. Serial No. 553,976.

*To all whom it may concern:*

Be it known that we, WILLIAM F. GRADOLPH and WILLIAM C. HAHNE, both citizens of the United States, and residents of St. Louis, Missouri, and Chicago, Illinois, respectively, have invented certain new and useful Improvements in Methods of Transmitting Electrical Energy, of which the following is a specification containing a full, clear, and exact description, reference being had to the accompanying drawings, forming a part hereof.

Our invention relates to the transmission of electrical energy by means of alternating or undulating currents; and, briefly stated, our primary object is to overcome certain well-known difficulties which have heretofore limited the distance over which the current can successfully be transmitted.

Our invention is applicable to a great variety of uses; for instance, the transmission of power, for telephony, and for electric signaling.

In the transmission of a simple electrical wave over an electrical conductor of great length characterized by high resistance, electrostatic capacity and inductive leakages, energy lost or dissipated is proportional to and expressible in simple terms of the reactive constants of the systems and there is no distortion of the wave form.

Our method of transmission of electrical energy, for whatever purpose, reduces, by a much greater degree than by any previous method, the self or static induction of the line, thus very greatly increasing the distance over which successful transmission of electrical energy can be accomplished; and, moreover, the practice of our method necessitates but slight, if any, change in the external circuit as it exists under the improved practice of the present time.

In the transmission of alternating, undulating or intermittent currents, it is well-known that the high capacity of closely associated conductors is a great hindrance to economic transmission and a preventive of transmission through underground cables of any great length.

The line losses in a power transmission circuit, due to self and static induction, are of vital importance; and, inasmuch as our invention overcomes these defects to a very considerable degree, we are enabled to deliver to the translating device, whatever that may be, a larger proportion of the generated currents than has, so far as we are aware, been possible in the systems heretofore proposed.

The nature of our invention will be best understood by describing it in connection with a diagrammatic illustration of apparatus by which the invention may be carried into effect.

Figure 2:
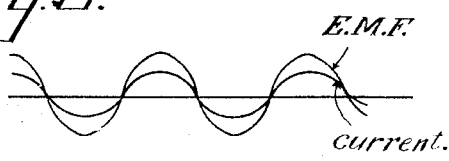
Figure 3:
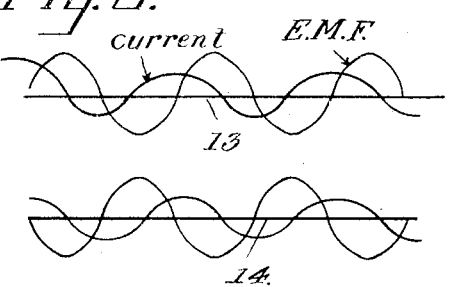
Figure 4:
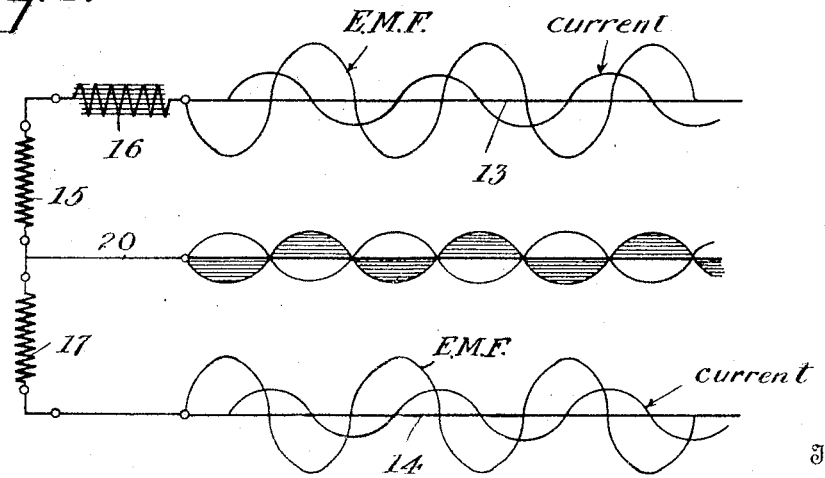

In the accompanying drawings, Figure 1 is a diagram illustrating a system for transmitting electrical power for industrial purposes embodying our invention. Fig. 2 is a diagram showing graphically the current waves when in phase, as in the ordinary practice of alternating currents, the view illustrating the phase relations of currents in the ordinary circuit containing only resistance. Fig. 3 is a diagram showing current waves as displaced in phase by our invention, the current on one side or line leading by approximately ninety degrees, while on the other line it lags approximately ninety degrees. Fig. 4 is a diagram which shows graphically the condition of the current waves in the external circuit arising from the application of our invention.

In Fig. 1 is illustrated diagrammatically a simple form or application of the present invention in a single phase system in which the translating device is an alternating current motor; and, for the sake of clearness, all step-down transformers, rectifiers or other apparatus, which it may be desirable to use in actual practice are omitted.

Referring to the drawings, 10 designates a single phase generator in which the primary transformer windings 11 and 12 are connected with each other in multiple and with the generator in series.

13 and 14 designate the two line wires of the circuit, the former being connected to the secondary winding 15 through a choke or impedance coil 16, and the latter connected directly to the secondary winding 17. 18 indicates the translating apparatus, in the present instance a motor. At the receiving or motor end of the circuit in the line 14 there is placed a choke or impedance coil 19. Connected with the central or neutral point between the secondary windings 15 and 17 at the generator end of the circuit is a surging or buffer line 20, which, if an open line, as indicated in the drawings, and which we consider the preferable form of the surging line, is of a length somewhat greater than a wave length.

21 designates the secondary winding of a transformer which is connected with the motor 18, and 22 and 23 are the primary windings, to which are connected respectively the conductors 13 and 14 of the external circuit. Connected to and leading from the central or neutral point between the primary windings 22 and 23 there is a surging or buffer line 24 which is preferably similar to the surging line 20 already described.

The operation of this system is, to the best of our knowledge and belief, as follows: The currents produced by the generator 10 and passing through the primary coils 11 and 12 are, by induction, reproduced in the secondary coils 15 and 17; and these induced currents being in phase would, in a simple single phase circuit, add up; but the line 20 permits a surge wave to take place in it, so that the independence of the two secondary currents is preserved. The current from the secondary winding 15 is, by the impedance coil 16, caused to lag approximately ninety degrees behind the E. M. F., while the current in the opposite line 14, flowing from the secondary coil 17, is, by the electrostatic capacity or condenser effect of the lines 13 and 14 and the surging line 20, caused to lead the E. M. F. by approximately ninety degrees throughout the line 14 until the impedance 19 is reached. The result is that there is an out-of-phase condition in lines 13 and 14 to an extent of approximately one hundred and eighty degrees between the currents in the two lines, as graphically illustrated in Figs. 3 and 4.

Fig. 2 illustrates the phase relations of currents flowing in a circuit which contains only resistance. From this view it is seen that the waves pass through zero and reach their maximum values at the same instant in the two lines and are said to be in phase; and it will be further noted that the polarity of the current wave in one line is always of a contrary sign to the current wave in the other; that is to say, the direction at any instant of the current flow in one line is opposite to that of the current flow in the other. On the other hand, it will be noted, by reference to Figs. 3 and 4, which show what would be the ideal conditions in the use of our method, that the polarities of the currents in the two lines are always of the same sign; that is, the direction of the current flow at any instant in one line is the same as that in the other; and consequently if such ideal conditions could be attained in practice the self induction and capacity effect between the two lines would be zero, and these ideal conditions we approximate by the use of our invention.

By providing the surging line 20, the currents in the lines 13 and 14 are in effect independent. The result is that the impedance 16 affects only the current in line 13, while the condenser action of the lines 14 and 20 affects only the current in the line 14, and for these reasons the phase in line 13 is retarded while that in line 14 is advanced, and the waves are transmitted from the circuit with phase relations at least approaching that shown in Figs. 3 and 4.

The surging lines 20 and 24 combined with the lines 13 and 14 and the impedance coils therein form two practically independent circuits, and by the particular arrangement of the impedance coils the current flowing through one circuit is caused to lag approximately ninety degrees behind the E. M. F., while the current in the opposite circuit flows unimpeded until the end of the circuit is reached, where it is impeded, thus bringing about a difference of potential and restoring the conditions originally set up in the secondary coils at the sending or generator end of the circuit. To be more specific, in the operation of our method, when energy is applied to the primary windings 11 and 12 it induces currents in the two secondary windings 15 and 17. The winding 15 sends the current out over the line 13 through the impedance coil 16 and out over the surging line 20, while the coil 17 sends current out over the line 14 and the surging line 20. It is obvious that the current generated in coil 15 will send a positive or a negative impulse, whichever the case may be, out over the line 13 of the opposite polarity to that on the line 20. Likewise when a current is generated in coil 17, a positive or negative impulse, whichever the case may be, is sent out over the lines 14 and 20; and at all times will the currents generated in the coils 15 and 17 be either positive or negative at the same instant on the lines 13 and 14 due to the action of the impedance 16 in conjunction with that of capacity existing in lines 13, 14 and 20. It is therefore possible that part of the energy set up by the coil 15 will pass out over the circuit 13 and 20 without taking the path 17 and 14, and again part of the energy set up by the coil 17 will pass out over 14 and 20 without taking the path 15 and 13. We may consider that part of the energy of the coil 15 takes in each case the path 16, 13 and 20 and that part of the energy of coil 17 takes in each case the path 14, 17 and 20, in which case an independent action of the coils 15 and 17 is preserved.

It is believed from numerous tests and experiments of this system that its successful operation depends upon the impedance and the surging or buffer lines 20 and 24 and the capacity conditions existing between the lines 13 and 14, 13 and 20 and 14 and 20 and their inductive relations to each other.

It will be understood that the more nearly the currents in the two lines are kept one hundred and eighty degrees out of phase, and the more nearly they are brought into phase at the translating device, the greater is the percentage of the energy delivered to the translating device, and it is therefore desirable to approximate these conditions as nearly as possible.

It may be stated that while the line conductors may be in any position relative to each other, they must, in every instance, be arranged in inductive relation to the surging line.

It will be understood that where the surging line extends to the translating device, the line conductors, if in inductive relation thereto, are also in inductive relation to each other.

The apparatus herein described and illustrated in the drawings is not claimed in this case, but is made the subject of another application, Serial No. 292,529, filed by us on the 20th day of December, 1905, of which application this case is a division.

What we claim is:

1. The herein described method of transmitting electrical energy which consists in generating an alternating current and delivering it to a circuit, altering adjacent to the generator end of the circuit the normal phase relations of the currents in the two sides of the circuit, and finally restoring the normal phase relations of the currents in the two sides of the circuit near the receiving end of the circuit before delivering them to translating apparatus.

2. In a system for the transmission of electrical energy, the method which consists in generating an alternating current and delivering it to a circuit, retarding the phase of the current approximately ninety degrees in one line of the circuit, and causing the current to lead approximately ninety degrees in the other line of the circuit, whereby the currents in the two lines are approximately one hundred and eighty degrees out of phase at the same instant at opposite points, and restoring the normal phase relations of the currents in the two lines of the circuit before delivering them to translating apparatus.

3. The herein described method of transmitting electric energy over a circuit, the sides of which are in inductive relation to each other, which consists first in generating an electric current and delivering it to the circuit, then retarding the flow of the current in one side of the circuit at the transmitting end thereof, and correspondingly advancing the flow in the opposite side of the circuit, and finally restoring the normal phase relations of the current before it is delivered to the translating apparatus.

In testimony whereof, we have signed our names to this specification, in presence of two subscribing witnesses.

WILLIAM F. GRADOLPH.
WILLIAM C. HAHNE.

Witnesses:
CHAS. A. NIEL,
MASON K. BLAKE.